United States Patent [19]

De Keyzer

[11] Patent Number: 5,213,439
[45] Date of Patent: May 25, 1993

[54] PROCESS FOR MARKING A PAVEMENT

[75] Inventor: Noel R. M. De Keyzer, Ottignies, Belgium

[73] Assignee: Shell Oil Company, Houston, Tex.

[21] Appl. No.: 829,184

[22] Filed: Jan. 31, 1992

[30] Foreign Application Priority Data

Feb. 14, 1991 [GB] United Kingdom ............... 9103150

[51] Int. Cl.$^5$ ........................ E01C 23/16; C08L 53/02
[52] U.S. Cl. ........................................ 404/12; 404/14; 404/94; 524/14; 525/64
[58] Field of Search .................. 404/12, 14, 94, 72, 404/79; 524/14, 68, 271, 274, 505; 525/63, 64, 69, 71, 75

[56] References Cited

U.S. PATENT DOCUMENTS

| | | | |
|---|---|---|---|
| 3,664,242 | 5/1972 | Harrington et al. | 404/94 X |
| 4,185,132 | 1/1980 | Gurney | 404/12 X |
| 4,203,878 | 5/1980 | Bauer | 404/12 X |
| 4,994,508 | 2/1991 | Shiraki et al. | 525/64 X |

FOREIGN PATENT DOCUMENTS

| | | |
|---|---|---|
| 2407159 | 2/1974 | Fed. Rep. of Germany . |
| 2242449 | 5/1975 | France . |
| 1226234 | 3/1971 | United Kingdom . |
| 2059430 | 4/1981 | United Kingdom . |
| 2061295 | 5/1981 | United Kingdom . |

Primary Examiner—William P. Neuder

[57] ABSTRACT

A process for marking a pavement comprising melting a dry blended thermoplastic pavement marking composition which contains an elastomer and a substantially non-aromatic hydrocarbon resin and applying the molten composition thus obtained to the pavement, wherein the elastomer is a block copolymer containing at least one poly(conjugated diene) block which may or may not have been hydrogenated and at least two poly(vinylaromatic) blocks, which block copolymer is present in the dry-blended composition in the form of a powder.

20 Claims, No Drawings

PROCESS FOR MARKING A PAVEMENT

BACKGROUND OF THE INVENTION

This invention relates to a process for marking a pavement with a blend of an elastomer and a hydrocarbon resin.

The conventional thermoplastic pavement marking compositions comprise a thermoplastic binder, containing an elastomer and a hydrocarbon resin, and one or more other eligible constituents, such as pigments, glass beads and fillers, and are applied to the surface of the pavement as a hot melt. Said compositions may also comprise additives which improve, for example, the stability of the marking or the adhesion of the binder to the other constituents. Upon application, the compositions form a layer on the surface of the pavement which layer is allowed to cool to ambient temperature so that a solidified layer is formed within a short period of time. The compositions may be applied to the pavement of roads, squares, side-walks, platforms, runways, et cetera. Various types of pavements are eligible, such as concrete pavements, tile pavements and asphaltic pavements. Examples of the relevant compositions are given in DE-A-2407159, GB-A-2059430 and GB-A-2061295. Hydrocarbon resins my may also be refer to by the term "petroleum resin".

A conventional type of process for marking a pavement comprising melting a dry-blended thermoplastic pavement marking composition which contains an elastomer and a substantially (cyclo)aliphatic hydrocarbon resin and applying the molten composition thus obtained to the pavement, wherein the elastomer is an ethylene/vinyl acetate copolymer is known for a rather long time. In this process the ethylene/vinyl acetate copolymer and the hydrocarbon resin are dry blended in advance with one or more of the other constituents and, optionally, the additives to form the dry-blended thermoplastic pavement marking composition. Optionally, additional ingredients may be added to the molten composition.

This operation, which comprises dry blending, provides several advantages in comparison with an operation comprising melt blending, referred to hereinafter, which advantages may bring about an important cost reduction and an increased flexibility of operation. Firstly, dry blending is more simple and does not require expensive high-shear melt-blending equipment. Secondly, the dry-blended composition can be molten just prior to the application to the pavement surface and, preferably, at the location of the pavement to be marked. Thirdly, in the whole operation, from the preparation of the composition until the application to the pavement surface, there may only one melting step involved, viz. prior to the application to the pavement, instead of two separate melting steps, viz. one melting step for blending and one prior to the application. Fourthly, the dry-blended pavement marking composition may be bagged as such, transported and sold as a composition which is easy to handle and ready for use, for example, in a simple pavement marking apparatus equipped with a heating kettle. In addition, in the melt-blending procedure the meltblended composition is often obtained in the form of lumps or blocks which require reduction in size in order to facilitate melting prior to the application.

However, this process, which involves the use of a dry-blended pavement marking composition, has a serious disadvantage in that markings are obtained which have inferior mechanical properties and accordingly a relatively short service life, compared to markings made from compositions which comprise a thermoplastic rubber, i.e. a block copolymer containing at least two poly(vinylaromatic) blocks and at least one poly(conjugated diene) block. The inferior properties involved are, for example, a low low-temperature flexibility, which may result in a high rate of crack formation, and a low abrasion resistance, in particular against the abrasive action of the spikes of winter tires.

Another type of the known pavement marking compositions is based on a thermoplastic binder comprising a substantially non-aromatic hydrocarbon resin and a thermoplastic rubber, referred to hereinbefore. Unfortunately, the preparation of these pavement marking compositions requires melt blending of the thermoplastic rubber crumbs with the hydrocarbon resin and the other constituents with high-shear stirring in order to obtain a composition with satisfactory properties. This is remarkable because at the temperature of blending the thermoplastic rubber as well as the hydrocarbon resin are present in the liquid state. The requirement of high-shear stirring is also remarkable because other pavement marking compositions, for example those which comprise a hydrocarbon resin and an ethylene/vinyl acetate copolymer, can be prepared starting from the thermoplastic ingredients in their usual delivery form, e.g. in the form of pellets or lumps, without applying high-shear stirring during melt blending.

The use of a thermoplastic rubber in thermoplastic pavement compositions thus implies that expensive high-shear melt-blending equipment has to be applied. It is therefore virtually unavoidable to apply two separate melting steps: one melting step at a well-equipped location for blending of, at least, the thermoplastic rubber with the hydrocarbon resin and one melting step prior to the application of the composition to the pavement surface.

The aim of the present invention is to effect the very attractive combination of, on the one hand, applying the process for marking pavements in which the number of melting steps may be restricted to one, as mentioned hereinbefore, with, on the other hand, using a pavement marking composition based on a thermoplastic binder comprising a thermoplastic rubber and a hydrocarbon resin which composition possesses, after application, excellent abrasion resistance and low-temperature flexibility.

In a recent investigation into this matter it was attempted to avoid the use of high-shear stirring during melt blending of thermoplastic rubber crumbs with a hydrocarbon resin and the other constituents by making use of crumbs which were soaked in an oil. The result, however, was unsatisfactory because an impractical, very long blending time appeared to be required, and the prolonged exposure to high temperature, in addition, resulted in degradation of the thermoplastic binder with loss of viscosity and discoloration.

SUMMARY OF THE INVENTION

A homogeneous melt comprising a thermoplastic rubber and a substantially non-aromatic hydrocarbon resin is obtained for marking a pavement without high-shear stirring by melting a dry blend of the thermoplastic rubber and the hydrocarbon resin in which the thermoplastic rubber is present in the form of a powder. The thermoplastic rubber is a block copolymer comprising at least one poly(conjugated diene) block and at least two poly(vinylaromatic) blocks.

DETAILED DESCRIPTION OF THE INVENTION

As a result of extensive research and experimentation it has now, surprisingly, been found that a homogeneous melt comprising a thermoplastic rubber and a hydrocarbon resin can be obtained within a practical, short period of time and without high-shear stirring by melting and smooth stirring a dry blend of the thermoplastic rubber and the hydrocarbon resin in which the thermoplastic rubber is present in the form of a powder. The melt obtained did not show any sign of degradation. It has also been found that only the thermoplastic rubber needs to be present in the form of a powder, which means that the hydrocarbon resin may be present in any convenient form. The results are surprising in view of GB-A-1226234, which teaches that thermoplastic rubbers form storage stable blends with hydrocarbon resins or hydrocarbon resin/oil mixtures of which more than 28% of the carbon atoms are aromatic, whilst the present hydrocarbon resins are substantially non-aromatic.

The implication of the finding is that dry-blended pavement marking compositions which comprise a powdered thermoplastic rubber and a non-aromatic hydrocarbon resin are suitable for use in a process for marking pavements in which the number of melting steps may be restricted to one.

Said dry-blended pavement marking compositions which contain in addition other constituents such as pigments, glass beads and fillers are novel compositions and form another feature of the present invention.

Accordingly, the present invention relates to a process for marking a pavement comprising melting a dry-blended thermoplastic pavement marking composition which contains an elastomer and a substantially non-aromatic hydrocarbon resin and applying the molten composition thus obtained to the pavement, wherein the elastomer is a block copolymer containing at least one poly(conjugated diene) block which may optionally have been hydrogenated and at least two poly(vinylaromatic) blocks, which block copolymer is present in the dry-blended composition in the form of a powder.

The invention relates, in addition, to dry-blended thermoplastic compositions for use in pavement marking which comprise a block copolymer containing at least one poly(conjugated diene) block which may optionally have been hydrogenated and at least two poly(vinylaromatic) blocks, a substantially non-aromatic hydrocarbon resin and one or more additional constituents selected from the group consisting of pigments, glass beads and fillers, wherein the block copolymer is present in the form of a powder. Finally, the invention relate to pavement markings obtained by the process of the invention.

The elastomer applied in the process of the invention is a block copolymer containing at least one poly(conjugated diene) block which may or may not have been hydrogenated and at least two poly(vinylaromatic) blocks. The block copolymer may a linear or a star-shaped block copolymer, represented by the general formulae $(A-B)_n-A$ and $(A-B)_{n+1}X$ wherein A represents the poly(vinylaromatic) block, B represents the optionally hydrogenated poly(conjugated diene) block, X represents the moiety derived from a polyvalent coupling agent, for example 1,3- and 1,4-divinylbenzene, silicon tetrachloride and stannic tetrachloride, and n is an integer from 1 to 3, preferably, $n=1$. Particularly preferred is a block copolymer represented by the general formula A-B-A.

The poly(vinylaromatic) block may have been formed predominantly from vinyl aromatics such as styrene, α-methylstyrene, 4-tert.-butylstyrene and 4-vinyltoluene. Preferably, the vinyl aromatic is styrene, so that the poly(vinylaromatic) block is preferably a polystyrene block. Typically, the molecular weight of the poly(vinylaromatic) block is from 5000 to 125000, preferably from 6000 to 50000, and more preferably from 8000 to 15000. The molecular weights referred to herein are number-average molecular weights. Suitably, the poly(vinylaromatic) block(s) comprise(s) from 8 to 65% by weight of the block copolymer, preferably from 10 to 50%.

The poly(conjugated diene) block may have been formed predominantly from conjugated dienes such as 1,3-butadiene, isoprene, 2,3-dimethyl-1,3-butadiene and 1,3-pentadiene. Preferably, the conjugated diene is 1,3-butadiene or isoprene, so that the poly(conjugated diene) block is a polybutadiene block or a polyisoprene block. It is not essential to the invention whether the conjugated dienes are incorporated into the poly(conjugated diene) block by 1,2- and/or by 1,4-addition and whether or not the olefinically unsaturated bonds present in the poly(conjugated diene) block have partly or completely been hydrogenated. Good results can be obtained with block copolymers of which the the poly(conjugated diene) block had not been hydrogenated.

By the term "predominantly" it is meant throughout the present specification that a minor amount of the monomers constituting one type of polymer block may be included in the other type of polymer block, e.g. a poly(conjugated diene) block may comprise a minor amount of vinyl aromatic monomer.

The molecular weight of the block copolymer may be chosen within wide limits. Eligibly, the molecular weight of the block copolymer is from 20000 to 1500000, preferably from 5000 to 500000 and, when the block copolymer is of the general formula A-B-A, the number-average molecular weight is, in particular, from 50000 to 250000.

Good results can be obtained with thermoplastic rubbers of the following types:
- polystyrene-polyisoprene-polystyrene triblock copolymer having a molecular weight of 150000 and in which the polystyrene blocks comprise 15% by weight of the block copolymer,
- polystyrene-polybutadiene-polystyrene triblock copolymer having a molecular weight of 70000 and in which the polystyrene blocks comprise 40% by weight of the block copolymer, and
- polystyrene-polybutadiene-polystyrene triblock copolymer having a molecular weight of 80000 and in which the polystyrene blocks comprise 29% by weight of the block copolymer.

It is essential to the process of the invention that the thermoplastic rubber is present in the dry-blended composition as a powder, preferably as a free-flowing powder. Various techniques for the manufacture of powders of thermoplastic rubbers are known in the art, for example techniques which involve milling or atomising. The powder may contain an agent, such as silica, which renders the particles tack-free. Eligibly substantially all powder particles are smaller than 2000 μm, suitably the size of the powder particles ranges substantially from 100 to 1500 μm, in particular substantially from 200 to 1200 μm. Good results can be obtained with powders which were prepared by cryogenic milling and which contain particles having a size of between 200 and 1200 μm.

The dry-blended thermoplastic pavement marking composition of the invention contains a substantially non-aromatic hydrocarbon resin. Hydrocarbon resin eligible for use in pavement marking compositions are usually prepared by processes, which are well known in the art, from olefin mixtures which comprise aliphatic and/or cycloaliphatic olefins. In order to increase the resistance of the pavement marking to degradation, e.g. due to environmental influences, a hydrocarbon resin is preferably chosen which has been made substantially free of olefinic carbon-carbon double bonds, for example, by hydrogenation.

Non-aromatic hydrocarbon resins which may be suitably applied can be further selected by means of a convenient method to characterize the compatibility of said resin with styrene-butadiene-styrene and styrene-isoprene-styrene block copolymers. The method involves the determination of solubility parameters as cloud point values, measured in degrees Celcius, using both a standard mixture of methylcyclohexane and aniline (MMAP cloud point) and a standard mixture of xylene and 4-hydroxy-4-methyl-2-pentanone (diacetone alcohol) (DACP cloud point).

The MMAP cloud point values determine the aromatic-aliphatic solubility parameters of the resin. The lower the MMAP cloud point value, the more aromatic character the resin possesses. The DACP cloud point, which is measured in a highly polar solvent, is a determination of the polarity of the resin.

Combination of MMAP and DACP values of different hyrocarbon resins usually made it possible to determine compatibility levels of the resins with different types of polymers. It was found that both high MMAP and high DACP values indicate aliphatic compatibility characteristics for the resins and can be an indication of the degree of hydrogenation of the resin.

For both cloud point methods, the resin is dissolved in the solvents by stirring at high temperature. When the resin is completely dissolved, the mixture is allowed to cool slowly. The temperature at which the resin precipitates is reported as the cloud point. The detailed procedure has been described in the Hercules technical brochure No. 25.029-E1, generally available in December 1990.

The DACP cloud point of the non-aromatic resin should higher than 60° C. which indicates a high degree of non-polarity of the resin and a good compatibility with the conjugated diene block of the rubber. More preferably the DACP cloud point value should be at least 70° C.

Examples of substantially non-aromatic hydrocarbon resins having both high MMAP and high DACP cloud points are the resins commercially available under the trademarks "NECIREZ" and "STATAC".

For convenient processing of the molten pavement marking composition and convenient application to the pavement the hydrocarbon resin has suitably an apparent viscosity of from 0.1 to 10 Pa.s, preferably from 0.5 to 5 Pa.s, as measured at 160° C. In order to achieve sufficient resistance of the pavement marking to deformation by mechanical forces at an elevated temperature of the pavement, it is preferred to chose a hydrocarbon resin which has a drop point of at least 90° C., more preferred in the range of from 100° to 130° C., which drop point is defined in ASTM D-3104 and can be measured by the method described therein. Good results can be obtained with non-aromatic hydrocarbon resins having an apparent viscosity in the range of from 1.0 to 2.2 Pa.s at 160° C. and a drop point of about 120° C.

The pavement marking compositions which are applied in the process of the invention eligibly comprises one or more additional constituents selected from the group consisting of pigments, glass beads and fillers. An oil, preferably a paraffinic oil, may suitably be added as a viscosity modifier. Yellow and white pigments may suitably be used. A very suitable white pigment is titanium dioxide, in particular rutile. Mineral aggregates are eligible for use as filler material. Although it is not essential to the invention, the dry-blended composition may also comprises one or more additives selected from the group consisting of hydrocarbon resins which are modified with, e.g., a carboxylic acid and which are not necessarily substantially non-aromatic, plasticizers, and stabilizers. These additives may promote adhesion of the thermoplastic binder to, for example, the filler particles, or they may enhance the resistance of the composition to degradation due to environmental influences.

The amounts of the substantially non-aromatic hydrocarbon resin and the block copolymer in the dry-blended pavement marking composition may vary between wide limits. Suitably, the block copolymer and the hydrocarbon resin are present in a weight ratio of from 0.5:99.5 to 20:80. A preferred weight ratio of the hydrocarbon resin and the block copolymer in the dry-blended composition ranges from 2:98 to 15:85. Suitably, the hydrocarbon resin and the block copolymer comprise together from 5 to 50% by weight of the dry-blended composition, from 10 to 30% by weight being a preferred amount.

In the process of the invention the dry-blended pavement marking composition is molten by heating the composition to a temperature which is sufficiently high for the thermoplastic rubber and the hydrocarbon resin to be present in the liquid state. The temperature is typically kept below the temperature at which there is a notable thermal degradation of the composition. For convenient application melting of the dry-blended composition is effected preferably by applying a temperature of from 150° to 230° C., more preferably from 170° to 220° C., and in particular from 180° to 210° C. A skilled person will appreciate that the molten composition is not a homogeneous melt, viz. the binder is present as a liquid in which the other constituent(s), such as the pigment(s), glass bead(s) and filler(s), form substantially a dispersed phase of solid particles.

The device in which the melting is carried out is not material to the invention. As stated hereinbefore, high-shear stirring during the melting is not needed. Suitably, melting of the dry-blended composition is carried out in a melting kettle equipped with a low-shear stirring device, for example a paddle stirrer.

It is thus an additional advantage of the process of the invention that relatively simple equipment can be used which allows that, preferably, melting of the dry-blended composition is carried out substantially at the location of the pavement to be marked. In a more preferred embodiment of the invented process melting of the dry-blended composition and application to the pavement is carried out using a single apparatus equipped for, both, the melting and the application.

Suitably, glass beads, which may be additional to those which may be present in the dry-blended composition, are applied to the surface of the molten composition simultaneous with or just after the molten composition has been applied to the pavement. An apparatus which can suitably be used is known from GB-A-2059430.

The pavement markings obtained by the process of the invention have an excellent performance with respect to low-temperature flexibility which is apparent from a very low rate of crack formation. In addition, the markings have a very good resistance to abrasion, in particular to the abrasion caused by winter tires which comprise spikes. The pavement markings obtained by the process of the invention thus possess a very good service life.

The invention will now be explained by the following non-limiting examples.

EXAMPLES

Samples of a thermoplastic rubber and substantially non-aromatic hydrocarbon resins were blended in a 10/90 weight ratio by rolling over a period of 10 minutes on a roller bank. The dry blend thus obtained was molten by heating using a hot-oil bath, which was kept at 200° C. During the heating the blend was stirred smoothly by means of a paddle stirrer. The blend adopted a temperature of about 180° C. Every 15 minutes a sample was taken and pressed between two glass plates to form a thin layer which was visually inspected for inhomogeneities. It was found that, after cooling to ambient temperature, homogeneous blends possess elasticity and heterogeneous blends possess a brittle continuous phase.

This procedure was carried out using samples of three different thermoplastic rubbers (A, B, C) and two different hydrocarbon resins (X, Y). The thermoplastic were tested in the form of a cryo-ground powder with a particle size ranging substantially from 200–1200 μm and, for comparative purposes, in the form of crumbs with a particle size ranging substantially from 5–10 mm.

The thermoplastic rubbers tested were of the following types:

A—a polystyrene-polyisoprene-polystyrene tri-block copolymer having a molecular weight of 150000 and in which the polystyrene blocks comprise 15% by weight of the block copolymer (CARIFLEX TR-KX83), B—a polystyrene-polybutadiene-polystyrene tri-block copolymer having a molecular weight of 70000 and in which the polystyrene blocks comprise 40% by weight of the block copolymer (CARIFLEX TR-KX138), and C—a polystyrene-polybutadiene-polystyrene tri-block copolymer having a molecular weight of 80000, in which the polystyrene blocks comprise 29% by weight of the block copolymer and having a particle size substantially between 200 and 1200 μm (CARIFLEX TR-1102).

CARIFLEX is a trade mark for commercially available thermoplastic rubbers.

According to the manufacturer's information hydrocarbon resin X is a cycloaliphatic hydrocarbon resin (NECIREZ LX 801-100) and hydrocarbon resin Y is an aliphatic hydrocarbon resin (STATAC T). The drop points, as measured by the procedures of ASTM D-3104, were found to be 121° C. and 120° C., respectively. NECIREZ and STATAC are trademarks.

The results obtained are presented in Table 1. The cloud point values for the non-aromatic resins used in the examples are compared to other resins in Table 2.

TABLE 1

| Blend | | Rubber | Homogeneity of blend after mixing time (minutes)[1] | | | |
|---|---|---|---|---|---|---|
| 10% Rubber | 90% Resin | Particles[2] | 15 | 30 | 45 | 60 |
| B | X | c | − | − | − | − |
| A | X | c | − | − | − | − |
| B | Y | c | − | − | − | − |
| A | Y | c | − | − | − | − |
| C | Y | c | − | − | − | − |
| B | X | p | − | +/− | + | + |
| A | X | p | − | +/− | + | + |
| B | Y | p | − | + | + | + |
| A | Y | p | + | + | + | + |
| C | Y | p | + | + | + | + |

[1] − : heterogeneous blend
+/− : almost heterogeneous blend
+ : homogeneous blend
[2] c : crumbs were used (comparative experiment)
p : powder was used

TABLE 2

| | Cloud Point | | Compatibility with |
|---|---|---|---|
| Resins | MMAP | DACP | elastomer |
| STATAC*T | 92° C. | 70° C. | good compatibility |
| NECIREZ*LX 801 | 70° C. | 70° C. | good compatibility |
| PICCOPALE* 100 | 96° C. | 60° C. | very poor/no compatibility |
| ESCOREZ* 1102 | 97° C. | 60° C. | no compatibility |

*Trademarks for hydrocarbon resins.

I claim:

1. A process for marking a pavement, comprising the steps of:
   dry-blending a substantially non-aromatic hydrocarbon resin with an elastomer powder;
   melting the dry-blended composition; and
   applying the molten composition to the pavement;
   wherein the elastomer powder is a powder of a block copolymer comprising at least one poly(conjugated diene) block and at least two poly(vinylaromatic) blocks and the hydrocarbon resin is compatible with the poly(conjugated diene) block.

2. The process of claim 1, wherein the block copolymer is of the general formula $(A-B)_n$-A or $(A-B)_{n+1}$X wherein A represents the poly(vinylaromatic) block, B represents the poly(conjugated diene) block, X represents a moiety derived from a polyvalent coupling agent, and n is an integer from 1 to 3.

3. The process of claim 2, wherein $n = 1$.

4. The process of claim 1, wherein each poly(vinylaromatic) block is a polystyrene block.

5. The process of claim 1, wherein the number average molecular weight of each poly(vinylaromatic) block is from 8000 to 15000.

6. The process of claim 1, wherein the poly(vinylaromatic) blocks comprise from 10 to 50% by weight of the block copolymer.

7. The process of claim 1, wherein the poly(conjugated diene) block is a polybutadiene block or a polyisoprene block.

8. The process of claim 1, wherein the number average molecular weight of the block copolymer is from 50000 to 500000.

9. The process of claim 3, wherein the number average molecular weight of the block copolymer is from 50000 to 250000.

10. The process of claim 1, wherein the elastomer powder has been prepared by cryogenic milling of all elastomer particles to a size smaller than 2000 μm.

11. The process of claim 10, wherein the size of the elastomer particles ranges substantially from 200 to 1200 μm.

12. The process of claim 1, wherein the hydrocarbon resin is substantially free of carbon-carbon double bonds.

13. The process of claim 12, wherein the hydrocarbon resin is a cycloaliphatic hydrocarbon resin having a MMAP cloud point of 70° C. and a DCAP cloud point of 70° C.

14. The process of claim 12, wherein the hydrocarbon resin is an aliphatic hydrocarbon resin having a MMAP cloud point of 92° C. and a DCAP cloud point of 70° C.

15. The process of claim 1, wherein the dry-blended composition comprises the hydrocarbon resin and the block copolymer in a weight ratio of from 2:98 to 15:85.

16. The process of claim 1, wherein the hydrocarbon resin and the block copolymer comprise together from 10 to 30% by weight of the dry-blended composition.

17. The process of claim 16, wherein the dry-blended composition further comprises glass beads.

18. The process of claim 1, wherein the dry-blended composition is melted at a temperature of from 180° to 210° C.

19. The process of claim 18, wherein the melting of the dry-blended composition is carried out in a melting kettle equipped with a low-shear stirring device.

20. The process of claim 1, further comprising the step of applying glass beads to the surface of the molten composition simultaneous with or just after the molten composition has been applied to the pavement.

* * * * *